United States Patent
Elden

(10) Patent No.: US 12,202,532 B2
(45) Date of Patent: Jan. 21, 2025

(54) COMPACT COLLAPSIBLE CARTS

(71) Applicant: dbest products Inc., Carson, CA (US)

(72) Inventor: Richard Elden, Manhattan Beach, CA (US)

(73) Assignee: dbest products, Inc., Carson, CA (US)

( * ) Notice: Subject to any disclaimer, the term of this patent is extended or adjusted under 35 U.S.C. 154(b) by 0 days.

(21) Appl. No.: 18/620,302

(22) Filed: Mar. 28, 2024

(65) Prior Publication Data

US 2024/0326885 A1 Oct. 3, 2024

Related U.S. Application Data

(60) Provisional application No. 63/577,067, filed on Mar. 28, 2023.

(51) Int. Cl.
*B62B 1/12* (2006.01)
*A45C 13/38* (2006.01)
(Continued)

(52) U.S. Cl.
CPC .............. *B62B 1/12* (2013.01); *A45C 13/385* (2013.01); *B62B 5/00* (2013.01); *B62B 5/067* (2013.01);
(Continued)

(58) Field of Classification Search
CPC ............. B62B 1/12; B62B 5/00; B62B 5/067; B62B 2206/006; B62B 2301/05; A45C 13/385
(Continued)

(56) References Cited

U.S. PATENT DOCUMENTS

| 1,554,034 A | 9/1925 | Richie |
| 2,132,069 A | 10/1938 | Hall |

(Continued)

FOREIGN PATENT DOCUMENTS

| CN | 206813544 U | 12/2017 |
| CN | 107668883 A | 2/2018 |

(Continued)

OTHER PUBLICATIONS

Amazon.com, "Foldable Utility Cart Portable Rolling Crate Handcart Shopping Trolley Collapsible 4 Rotate Wheels with Durable Heavy Duty Plastic Telescoping Handle for Travel Shopping Moving Storage Office Use", Available online at: "https://www.amazon.com/Portable-Handcart-Telescoping-Collapsible-Shopping/dp/B08HT17X39?th=1", Retrieved on Sep. 6, 2023, 8 pages.

(Continued)

*Primary Examiner* — Hau V Phan
(74) *Attorney, Agent, or Firm* — ORBIT IP, LLP

(57) ABSTRACT

Collapsible carts are disclosed. The collapsible carts include a frame, a load bearing member and a wheel assembly. The wheel assembly includes a housing with a horizontal pin channel and an elongated diagonal channel. The horizontal pin channel may be adapted to guide a pin to transpose horizontally along the horizontal pin channel while rotatably coupling a leg member of the frame to a horizontal section of the load bearing member. The elongated diagonal channel may be adapted to guide the horizontal section of the load bearing member to pivot around a pin axis and move from a horizontal plane in the open condition to a generally vertical plane in the closed condition. The movement of the horizontal section along the elongated diagonal channel actuates the housing to rotate around the generally vertical axis.

20 Claims, 12 Drawing Sheets

(51) Int. Cl.
*B62B 5/00* (2006.01)
*B62B 5/06* (2006.01)

(52) U.S. Cl.
CPC ..... *B62B 2206/006* (2013.01); *B62B 2301/05* (2013.01)

(58) Field of Classification Search
USPC ........................................................ 280/654
See application file for complete search history.

(56) References Cited

U.S. PATENT DOCUMENTS

| | | | |
|---|---|---|---|
| 2,362,721 A | 11/1944 | Reynolds | |
| 2,514,849 A | 7/1950 | Dewing | |
| 2,564,939 A | 8/1951 | Weast | |
| 2,715,533 A | 8/1955 | Strausburg | |
| 2,742,973 A | 4/1956 | Johannesen | |
| 2,757,935 A | 8/1956 | Sofia | |
| 2,786,692 A | 3/1957 | Timpson | |
| 2,957,700 A | 10/1960 | Beaurline | |
| 3,041,026 A | 6/1962 | Wilson | |
| 3,092,395 A | 6/1963 | Mitty et al. | |
| 3,135,527 A | 6/1964 | Knapp | |
| 3,276,786 A | 10/1966 | Olander | |
| 3,804,432 A | 4/1974 | Lehrman | |
| 4,202,521 A | 5/1980 | Harding | |
| 4,509,461 A | 4/1985 | Peck | |
| D292,135 S | 9/1987 | Grube et al. | |
| 4,765,644 A | 8/1988 | Bell | |
| 4,765,646 A | 8/1988 | Cheng | |
| 4,784,405 A * | 11/1988 | Stein | B62B 1/12 |
| | | | 280/655 |
| 4,852,520 A | 8/1989 | Goetz | |
| 4,887,837 A | 12/1989 | Bonewicz, Jr. et al. | |
| 4,896,897 A * | 1/1990 | Wilhelm | B62B 1/125 |
| | | | 280/655 |
| 4,977,857 A | 12/1990 | Slawinski | |
| 5,197,754 A | 3/1993 | Ward | |
| 5,244,219 A | 9/1993 | Hadlum | |
| 5,294,158 A | 3/1994 | Cheng | |
| D352,145 S | 11/1994 | Perez | |
| 5,603,573 A | 2/1997 | Mercier et al. | |
| 5,653,194 A | 8/1997 | Guy | |
| 5,660,476 A * | 8/1997 | DeCoster | A45C 13/02 |
| | | | 383/110 |
| 5,678,842 A | 10/1997 | Hook et al. | |
| 5,765,665 A | 6/1998 | Cheng et al. | |
| 5,884,982 A | 3/1999 | Yemini | |
| 5,988,671 A | 11/1999 | Abelbeck et al. | |
| 6,021,740 A | 2/2000 | Martz | |
| 6,076,485 A | 6/2000 | Peeples et al. | |
| 6,126,183 A | 10/2000 | Lensing | |
| 6,431,580 B1 | 8/2002 | Kady | |
| 6,561,524 B1 | 5/2003 | Medina | |
| 6,598,898 B2 | 7/2003 | Chu | |
| D477,916 S | 8/2003 | Nykoluk | |
| 6,601,859 B2 | 8/2003 | Durham | |
| 6,626,634 B2 | 9/2003 | Hwang et al. | |
| 6,651,791 B1 | 11/2003 | Nykoluk et al. | |
| 6,688,516 B1 | 2/2004 | Ussen | |
| 6,918,474 B2 | 7/2005 | Nykoluk | |
| 7,066,476 B2 | 6/2006 | Elden | |
| D525,758 S | 7/2006 | Lynch | |
| 7,140,635 B2 | 11/2006 | Johnson et al. | |
| 7,147,243 B2 | 12/2006 | Kady | |
| D545,025 S | 6/2007 | Elden | |
| 7,316,407 B1 | 1/2008 | Elden | |
| D565,269 S | 3/2008 | Tomasiak et al. | |
| 7,458,451 B2 | 12/2008 | Godshaw et al. | |
| 7,617,797 B2 | 11/2009 | Lam | |
| 7,731,221 B2 | 6/2010 | Bess | |
| 7,789,044 B2 | 9/2010 | McGrade | |
| 7,914,015 B2 | 3/2011 | Tompkins | |
| D642,764 S | 8/2011 | Elden | |
| 8,317,219 B2 * | 11/2012 | Bruce | B62B 1/266 |
| | | | 280/654 |
| 8,366,124 B1 | 2/2013 | Caldwell | |
| 8,439,374 B1 | 5/2013 | Elden | |
| D690,893 S | 10/2013 | O'Brien | |
| 8,579,305 B2 | 11/2013 | Hou | |
| 8,641,059 B2 | 2/2014 | Khodor et al. | |
| 8,915,504 B1 | 12/2014 | Seibert | |
| D723,237 S | 2/2015 | Maddux et al. | |
| 9,233,700 B1 | 1/2016 | Elden | |
| 9,382,035 B2 | 7/2016 | Fritz | |
| 9,392,766 B1 | 7/2016 | Elden | |
| 10,588,388 B2 | 3/2020 | Kabalin | |
| 10,676,235 B1 | 6/2020 | Song et al. | |
| D904,716 S | 12/2020 | Shen | |
| 11,001,285 B1 * | 5/2021 | Gayk | B62B 1/002 |
| D930,314 S | 9/2021 | Huang | |
| 11,110,948 B2 * | 9/2021 | Song | B62B 5/067 |
| D932,186 S | 10/2021 | Brunner et al. | |
| D942,107 S | 1/2022 | Ren | |
| 11,623,676 B2 * | 4/2023 | Hall | B62B 1/22 |
| | | | 280/47.17 |
| 2002/0050429 A1 | 5/2002 | Nykoluk et al. | |
| 2002/0089134 A1 | 7/2002 | Salzberger et al. | |
| 2002/0139628 A1 | 10/2002 | Chang | |
| 2002/0144874 A1 | 10/2002 | Nykoluk et al. | |
| 2003/0011173 A1 | 1/2003 | Shall | |
| 2004/0075248 A1 | 4/2004 | Elden | |
| 2004/0211635 A1 | 10/2004 | Lu | |
| 2005/0275195 A1 | 12/2005 | Matula et al. | |
| 2006/0278173 A1 | 12/2006 | Kamijo | |
| 2007/0215425 A1 | 9/2007 | Slater | |
| 2009/0145913 A1 | 6/2009 | Panosian et al. | |
| 2009/0205578 A1 | 8/2009 | Alves | |
| 2009/0212536 A1 | 8/2009 | Tadeo | |
| 2010/0026080 A1 | 2/2010 | Colchiesqui | |
| 2010/0175633 A1 | 7/2010 | Krauss et al. | |
| 2011/0056441 A1 | 3/2011 | Chang | |
| 2011/0197823 A1 | 8/2011 | Pietra | |
| 2012/0055122 A1 | 3/2012 | Beauchamp | |
| 2012/0274052 A1 | 11/2012 | Zhu | |
| 2013/0320641 A1 | 12/2013 | Zhang | |
| 2015/0360710 A1 | 12/2015 | Thompson | |
| 2017/0001654 A1 | 1/2017 | Obrien | |
| 2017/0120679 A1 | 5/2017 | Naiva | |
| 2017/0297601 A1 | 10/2017 | Carbonaro | |
| 2018/0014502 A1 | 1/2018 | O'Shaughnessy et al. | |
| 2019/0216193 A1 | 7/2019 | Kabalin | |
| 2019/0322302 A1 | 10/2019 | Greenup | |
| 2020/0269898 A1 | 8/2020 | Frankel et al. | |

FOREIGN PATENT DOCUMENTS

| | | |
|---|---|---|
| CN | 207120985 U | 3/2018 |
| CN | 207191693 U | 4/2018 |
| CN | 207506081 U | 6/2018 |
| CN | 108328065 A | 7/2018 |
| CN | 208070260 U | 11/2018 |
| CN | 304926177 S | 12/2018 |
| CN | 305015819 S | 1/2019 |
| CN | 209177176 U | 7/2019 |
| CN | 210747711 U | 6/2020 |
| CN | 214777508 U | 11/2021 |
| DE | 202020102798 U1 | 5/2020 |
| EP | 3318465 A1 | 5/2018 |
| GB | 2243198 A | 10/1991 |
| GB | 2349186 A | 10/2000 |

OTHER PUBLICATIONS

Amazon.com, Foldable Utility Cart Folding Portable Rolling Crate Handcart with Durable Heavy Duty Plastic Telescoping Handle Collapsible 4 Rotate Wheels for Travel Shopping Moving Luggage Office Use (Red), Available online at: "https://www.amazon.com/Foldable-Portable-Handcart-Telescoping-Collapsible/dp/B07YFG4BW6/ref=sr_1_1?dchild=1&keywords=B07YFG4BW6

(56) References Cited

OTHER PUBLICATIONS

&qid=1627442148&sr=8-1&th=1" Retrieved on Sep. 6, 2023, 9 pages.

Amazon.com, "Olympia Tools 85-015 Grand Folding Storage Rolling Cart with Telescopic Handle for Easy Transportation, Weight Capacity up to 150 Pounds", Available online at : "https://www.amazon.ca/Pack-N-Roll-85-015-917-85-015-Portable-Capacity/dp/B076D9XG7T?th=1", Retrieved on Sep. 6, 2023, 7 pages.

Amazon.com, "Olympia Tool 85-010 Grand Pack-N-Roll Portable Tool Carrier, Black" Available online at: "https://web.archive.org/web/20150727103951/http://www.amazon.com:80/Olympia-85-010-Pack-N-Roll-Portable-Carrier/dp/B000UZ0P7I", Retrieved on Sep. 6, 2023, 5 pages.

Bed Bath and Beyond.com, "Folding Crate Cart in Grey", 2022, 9 pages.

EBAY.com, "Dbest Products Quik Cart Elite Stair Climber wheeled rolling crate", May 31, 2022, 4 pages, https://www.ebay.com/itm/394062298897.

Global Industrial, "Olympia Tools Grand Pack-N-Roll® Rolling Folding Crate Cart 85-010-80 Lb. Capacity", Available online at: "https://www.globalindustrial.com/p/pack-n-roll-grand-rolling-folding-crate-cart-85-010", Retrieved on Sep. 6, 2023, 3 pages.

\* cited by examiner

COMPACT COLLAPSIBLE CARTS

RELATED APPLICATIONS

This application claims the benefit of U.S. Provisional Patent Application, Ser. No. 63/577,067, filed on Mar. 28, 2023, the disclosure of which is incorporated herein by reference in its entirety.

FIELD OF THE INVENTION

This patent document relates to collapsible carts, and more particularly, to collapsible carts with wheel assemblies that transition simultaneously with a load bearing member from an expanded open condition to a folded closed condition.

DESCRIPTION OF THE RELATED ART

Collapsible carts have been widely used in household and commercial settings. They provide a convenient way to transport objects when needed, but can be folded or collapsed for storage.

The following patents and published applications are representative prior art: 1. U.S. Pat. No. 2,564,939 issued to Louis S. Weast on Aug. 21, 1951 for "Foldable Shopping Cart"; 2. U.S. Pat. No. 2,786,692 issued to Anne Jackson Timpson on Mar. 26, 1957 for "Collapsible Cart"; 3. U.S. Pat. No. 3,092,395 issued to Sol Mitty et al. on Jun. 4, 1963 for "Corrugated Shopping Cart and Parts"; 4. U.S. Pat. No. 3,135,527 issued to Philip B. Knapp on Jun. 2, 1964 for "Wheeled Market Carts"; 5. U.S. Pat. No. Des. 292,135 issued to John W. Grube et al. on Sep. 29, 1987 for "Collapsible Cart"; 6. U.S. Pat. No. 4,765,644 issued to Laurence G. Bell on Aug. 23, 1988 for "Foldable Cart"; 7. U.S. Pat. No. 4,765,646 issued to Karen Cheng on Aug. 23, 1988 for "Collapsible Shopping Cart"; 8. U.S. Pat. No. 5,197,754 issued to Lyla B. Ward on Mar. 30, 1993 for "Collapsible Beach Cart"; 9. U.S. Pat. No. 5,244,219 issued to Sidney R. Hadlum on Sep. 14, 1993 for "Hand Held Carrier"; 10. U.S. Pat. No. 5,988,671 issued to Kevin G. Abelbeck et al. on Nov. 23, 1999 for "Collapsible Cart"; 11. United States Published Patent Application No. 2002/0050429 to Cory O. Nykoluk et al. on May 2, 2002 for "Pivotal Handle For Towable Baggage"; 12. United States Published Patent Application No. 2002/0139628 to Wen-Cheng Chang on Oct. 3, 2002 for "Retractable Handle Assembly"; 13. United States Published Patent Application No. 2002/0144874 to Cory O. Nykoluk et al. on Oct. 10, 2002 for "Pivotal Handle For Towable Baggage"; 14. U.S. Pat. No. 6,598,898 issued to Yong S. Chu on Jul. 29, 2003 for "Folding Cart"; 15. U.S. Pat. No. D477,916 issued to Cory O. Nykoluk on Aug. 5, 2003 for "Towing Member For A Piece of Baggage"; 16. U.S. Pat. No. 6,651,791 issued to Cory O. Nykoluk et al. on Nov. 25, 2003 for "Pivotal Handle For Towable Baggage"; 17. United States Published Patent Application No. 2004/0211635 to Chen-Tien Lu on Oct. 28, 2004 for "Apparatus for Mounting Telescopic Handle on Trunk"; 18. U.S. Pat. No. 6,918,474 issued to Cory O. Nykoluk on Jul. 19, 2005 for "Towable Wheeled-Backpack"; 19. United States Published Patent Application No. 2009/0212536 to Maria I. Tadeo on Aug. 27, 2009 for "Collapsible Rolling Tote Bag"; 20. U.S. Pat. No. 7,731,221 issued to Suzan L. Bess on Jun. 8, 2010 for "Collapsible and Portable Wheeled Dolly Particularly Suitable for Use by Students or Others in the Transport of Items"; 21. U.S. Pat. No. 7,066,476 issued to the named inventor Richard Elden on Jun. 27, 2006 for "Side Attachable Cover/Seat for a Cart Carrying Box"; 22. U.S. Pat. No. 7,147,243 issued to Darren Kady on Dec. 12, 2006 for "Accessories for a Collapsible Rolling Caddy"; and 23. U.S. Pat. No. 8,439,374 issued to the named inventor Richard Elden on May 14, 2013 for "Lightweight High Load Capacity Folding Utility Cart with Unique Support Structure and Ergonomic Handle."

Prior art collapsible cart designs, however, often grappled with challenges related to efficient and compact folding mechanisms, stable mobility, and compact storage. Such designs also compromise stability during movement or when folded. They also fail to optimize space utilization when the cart is not in use. These limitations highlight the need for innovative solutions that can address these shortcomings and offer a more practical and user-friendly collapsible cart design.

The inventions described in the present disclosure address these critical needs by introducing a novel wheel housing that folds for compact storage while allowing the cart to stand upright in a closed condition for optimize space utilization. This design not only enhances the cart's usability but also optimizes storage space, making it ideal for environments where space efficiency is paramount.

SUMMARY

Compact collapsible carts are disclosed herein. Embodiments of the present disclosure may include carts configured to transition from a closed condition where it may be folded up to an open condition where it may be expanded for use. The cart may include a frame, a load bearing member, a left wheel assembly and a right wheel assembly. In one embodiment, the frame may include a horizontal section extending from its left side to a lower vertical left leg member and from its right side to a lower vertical right leg member. The lower vertical left leg member and the lower vertical right leg member each may extend generally vertical along a first vertical plane.

The load bearing member (such as a platform) may be configured to transition from a closed condition where it is folded up to an open condition where it is expanded for use. The lead bearing member may include a bottom horizontal section with a left side and a right side. In the open condition, the bottom horizontal section may extend on each side to an arcuate section that extends to an elevated left and right horizontal sections.

The left and right wheel assemblies may each include a wheel housing and a wheel. The wheel housing may be configured to transition simultaneously with the load bearing member from a folded closed condition to an expanded open condition. The left wheel housing may be rotatably coupled to the lower vertical left leg member of the frame and the elevated left horizontal section of the lead bearing member. Meanwhile, the right wheel housing may be rotatably coupled to the lower vertical right leg member of the frame and the elevated right horizontal section of the lead bearing member.

In one embodiment, the left and right wheel housing each include a vertical receptacle, a front section, and a base section. The vertical receptacle may be adapted to receive the lower vertical left or right leg member of the frame, and include a horizontal pin channel guiding a first pin to transpose horizontally along the horizontal pin channel while rotatably coupling the lower vertical left or right leg member of the frame to the elevated left or right horizontal section of the load bearing member, respectively.

The front section may include an elongated channel having a diagonal channel between a first vertical channel and a second vertical channel. The elongated channel may be configured to guide the elevated left or right horizontal section of the load bearing member to move from a horizontal plane in the open condition that it is resting on a lower edge of the first vertical channel to a second vertical plane in the closed condition that it is adjacent an upper edge of the second vertical channel. As can be appreciated by persons skilled in the art, the movement of the elevated left or right horizontal section along the diagonal channel rotates the left or right wheel housing, respectively.

In one embodiment, the wheel is rotatably coupled to the wheel housing and elevated above the base section of the wheel housing.

In other embodiments, the cart may include an elongated U-shaped member having an upper section. The upper section may extend to an upper vertical left leg member and an upper vertical right leg member. The upper vertical left leg member may be rotatably coupled to the lower vertical left leg member, and the upper vertical right leg member may be rotatably coupled to the lower vertical right leg member. The elongated U-shaped member may also include a crossbar and a locking member. The crossbar may extend across from the upper vertical left leg member and the upper vertical right leg member. The locking member may be rotatably coupled to the crossbar and includes a fastener to removably attach to the horizontal section of the frame.

In some embodiments, the wheel housing includes an elongated left sidewall and an elongated right sidewall, whereby the left wheel may be positioned between and rotatably coupled to the elongated left sidewall and the elongated right sidewall. In other embodiments, the wheel housing includes a top section that is partially traversed by the second vertical channel of the elongated channel. Further, the elongated channel may separate two surfaces of the front section, whereby each surface aligned along a separate vertical plane.

Embodiments of the present disclosure may also include carts with a frame, a load supporting member, and a left and right wheel assemblies. The frame may include a left leg member and a right leg member. The left leg member may be aligned along a first frame axis and the right leg member may be aligned along a second frame axis. Like the prior embodiments, the load supporting member may include a bottom horizontal section with a left side and a right side. In an open condition, the bottom horizontal section may extend on each side to an arcuate section that extends to an elevated horizontal section.

The wheel assemblies may be configured to transition simultaneously with the load supporting member from an expanded open condition to a folded closed condition. In one embodiment, the left wheel assembly rotates clockwise around the first frame axis and the right wheel assembly rotates counterclockwise around the second frame axis to transition from an expanded open condition to a folded closed condition.

Each wheel assembly may include a housing with a horizontal pin channel and an elongated diagonal channel. The horizontal pin channel may be adapted to guide a pin defining a pin axis to transpose horizontally along the horizontal pin channel while rotatably coupling the left or right leg member of the frame to the elevated left or right horizontal section of the load supporting member, respectively. Meanwhile, the elongated diagonal channel may be adapted to guide the elevated left or right horizontal section of the load supporting member to pivot around the pin axis and move from a horizontal plane in the open condition to a generally vertical plane in the closed condition. Persons skilled in the art would appreciated that the movement of the elevated left or right horizontal section along the elongated diagonal channel actuates the left or right wheel housing to rotate around the first or second frame axis, respectively.

In one embodiment, the frame may be a collapsible frame with a first frame member and a second frame member. The collapsible frame may be configured to transition from a closed condition where it is folded up to an open condition where it is expanded for use by a relative pivoting of the first frame member to the second frame member. The first frame member may include a horizontal section and the second frame member may include a crossbar and a locking member. The locking member may be rotatably coupled to the crossbar and may include a fastener to removably attach to the horizontal section of the first frame member.

In another embodiment, the collapsible cart may include a flexible bag having four vertical walls, an openable top, and a bottom wall. The flexible bag may be removably coupled to the frame, and in an open condition, the flexible bag rests on the load supporting member.

Other embodiments of the present disclosure may also include collapsible carts with a frame having a leg member defining a generally vertical axis, and a load bearing member with a horizontal section rotatably coupled to the leg member via a pin defining a pin axis. Such embodiments may also include a wheel assembly configured to transition simultaneously with the load bearing member from an expanded open condition to a folded closed condition. Each wheel assembly may include a wheel rotatably coupled to a housing.

In one embodiment, the housing may include a horizontal pin channel and an elongated diagonal channel. The horizontal pin channel may be adapted to guide the pin to transpose horizontally along the horizontal pin channel while rotatably coupling the leg member of the frame to the horizontal section of the load bearing member. The elongated diagonal channel may be adapted to guide the horizontal section of the load bearing member to pivot around the pin axis and move from a horizontal plane in the open condition to a generally vertical plane in the closed condition. Artisans would appreciate that the movement of the horizontal section along the elongated diagonal channel may actuate the housing to rotate around the generally vertical axis.

In some embodiments, the wheel assembly may have a width at least equal to half of a width of the load bearing member. Further, the wheel assembly may be configured to rotate about forty-five degrees around the generally vertical axis to transition from an expanded open condition to a folded closed condition.

Each of the foregoing various aspects, together with those set forth in the claims and described in connection with the embodiments summarized above and disclosed herein may be combined to form claims for a device, apparatus, system, methods of manufacture and/or use in any way disclosed herein without limitation.

BRIEF DESCRIPTION OF THE DRAWINGS

These and other features, aspects and advantages are described below with reference to the drawings, which are intended to illustrate but not to limit the invention. In the drawings, like reference characters denote corresponding features consistently throughout similar embodiments.

DETAILED DESCRIPTION

Figure 1:
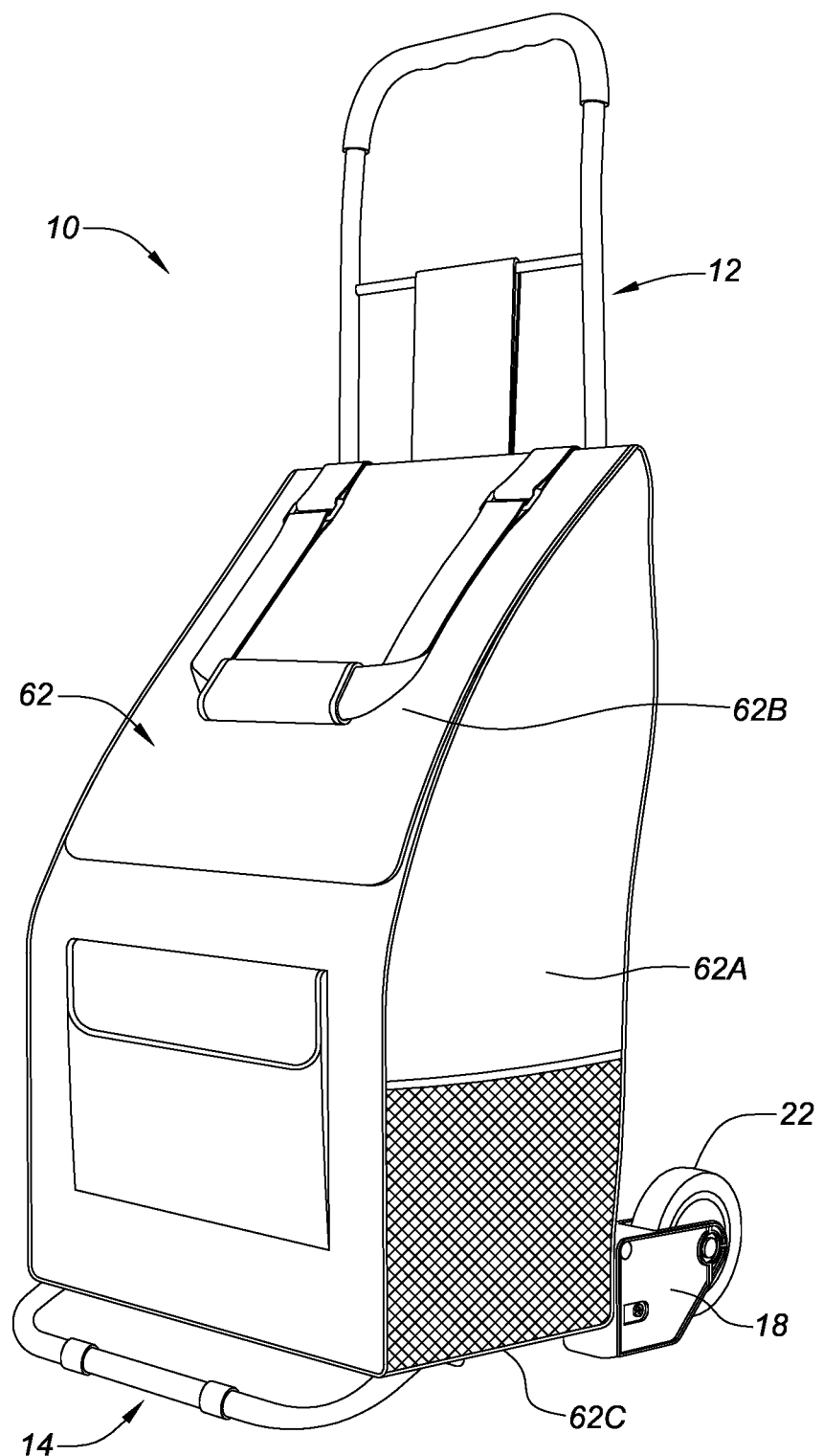
FIG. 1 is a perspective view of a collapsible cart with a flexible bag in an open condition, according to an embodiment.
Figure 2:
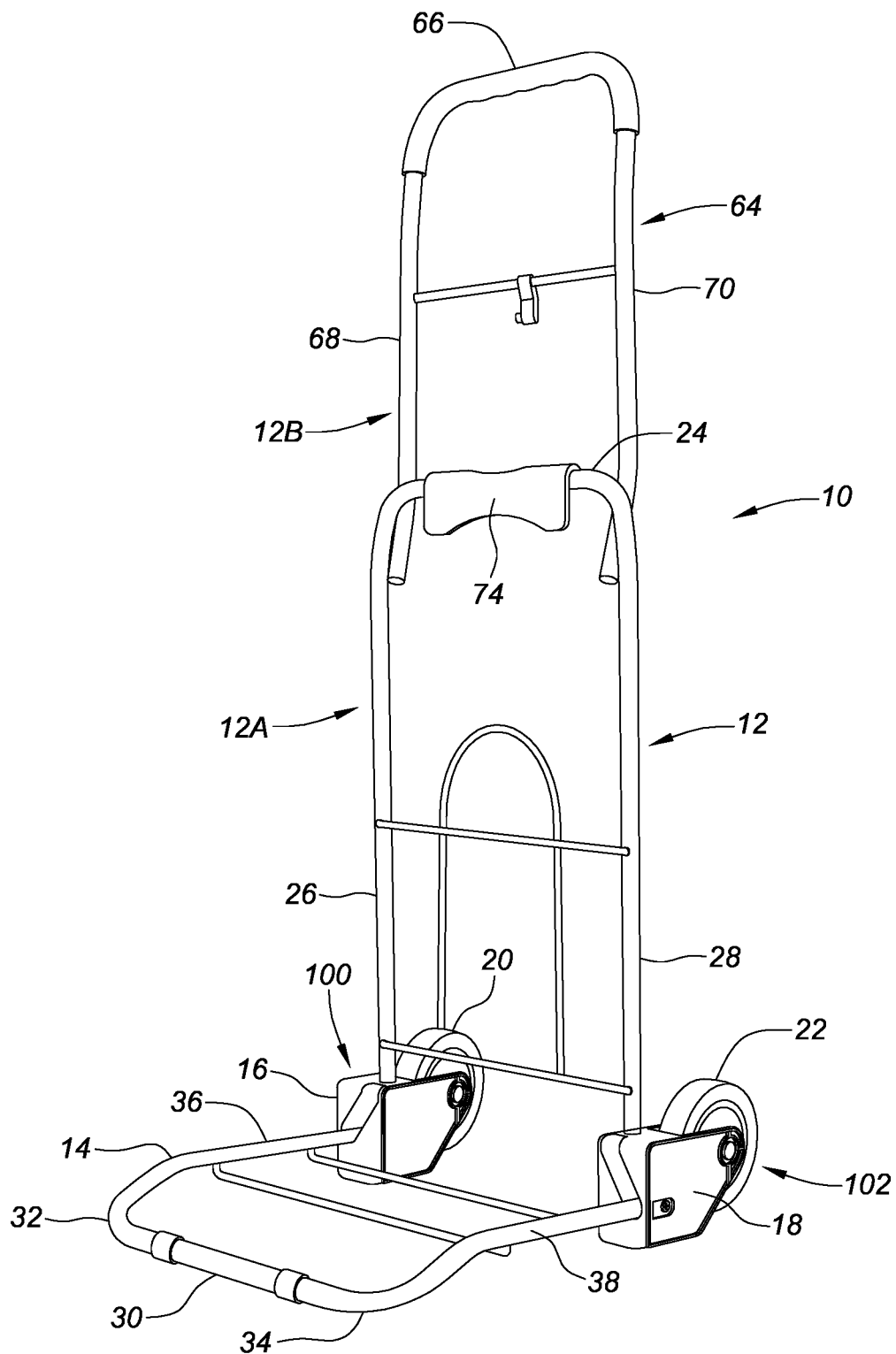
FIG. 2 is a perspective view of the collapsible cart from FIG. 1 without the flexible bag, according to an embodiment.
Figure 3:
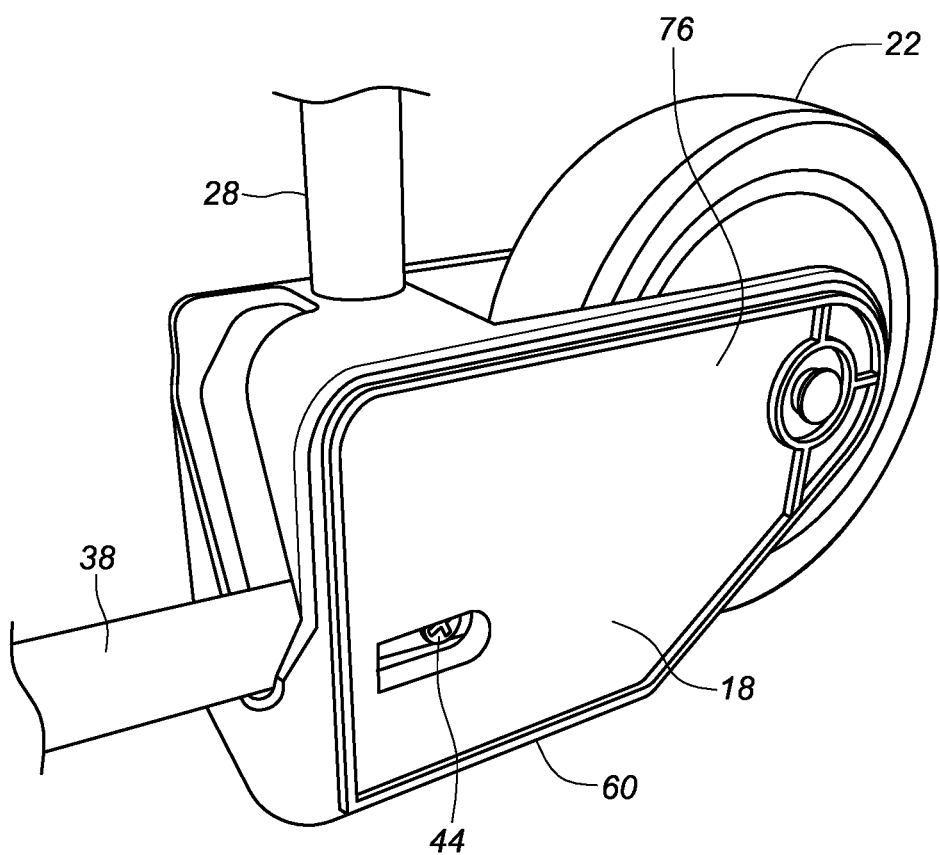
FIG. 3 is a perspective view of the right wheel assembly in FIG. 1, according to an embodiment.

Unique and inventive collapsible carts are disclosed herein. Although embodiments of rolling assemblies are disclosed herein, it is to be expressly understood that the present invention is not restricted solely to such embodiments. Rather, the present disclosure is directed to each of the inventive features described below, both individually as well as collectively, in various embodiments. Further, as will become apparent to those skilled in the art, one or more aspects of the present disclosure may be incorporated in other devices.

FIGS. 1-12 illustrate a collapsible cart 10, according to an embodiment of the present disclosure. In one embodiment, the collapsible cart 10 includes a frame 12, a platform 14, a left wheel housing 16, a right wheel housing 18, a left wheel 20 and a right wheel 22. The frame 12 may include a horizontal section 24 extending from its left side to a lower vertical left leg member 26 and from its right side to a lower vertical right leg member 28. In some embodiments, the lower vertical left leg member 26 and the lower vertical right leg member 28 each extending generally vertical along a first vertical plane.

As can be appreciated, the platform 14 may be configured to transition from a closed condition to an open condition and has a bottom horizontal section 30 with left and right sides. In the open condition, the bottom horizontal section 30 extends to left and right arcuate sections 32, 34, which extends to elevated left and right horizontal sections 36, 38, respectively.

In some embodiments, the left wheel housing 16 is configured to transition simultaneously with the platform 14 from a folded closed condition to an expanded open condition. The left wheel housing 16 may be rotatably coupled to the lower vertical left leg member 26 of the frame 12 and the elevated left horizontal section 26 of the platform 14.

As shown in FIGS. 3-7, in one embodiment, the left wheel housing 16 includes a vertical receptacle 40 adapted to receive the lower vertical left leg member 26 of the frame 12 and includes a horizontal pin channel 42 guiding a first pin 44 to transpose horizontally along the channel 42. As can be appreciated, this mechanism allows the left wheel housing 16 to rotatably couple to the elevated left horizontal section 26 of the platform 14.

Figure 4:
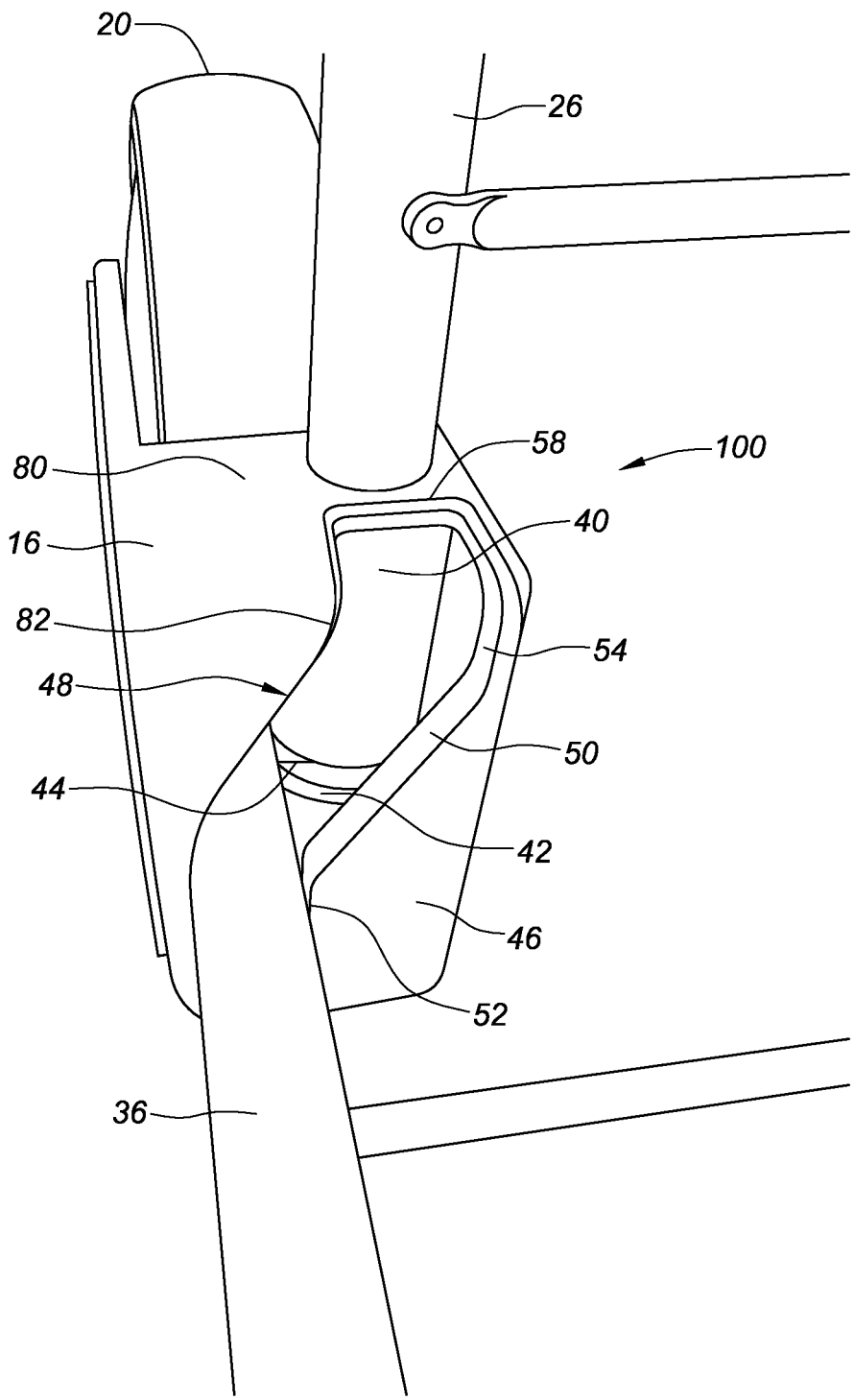
FIG. 4 is a perspective view of the left wheel assembly in FIG. 1, according to an embodiment.

As depicted in FIG. 4, the left wheel housing 16 may also include a front section 46 with an elongated channel 48 having a diagonal channel 50 between two vertical channels 52, 54. This configuration guides the movement of the elevated left horizontal section 36 from a horizontal plane to a vertical plane, causing rotation of the left wheel housing 16. As can be appreciated, the elongated channel 48 may be configured to guide the elevated left horizontal section 36 of the platform 14 to move from a horizontal plane in the open condition that it is resting on a lower edge 56 of the first vertical channel 52 to a second vertical plane in the closed condition that it is adjacent an upper edge 58 of the second vertical channel 54.

Figure 5:
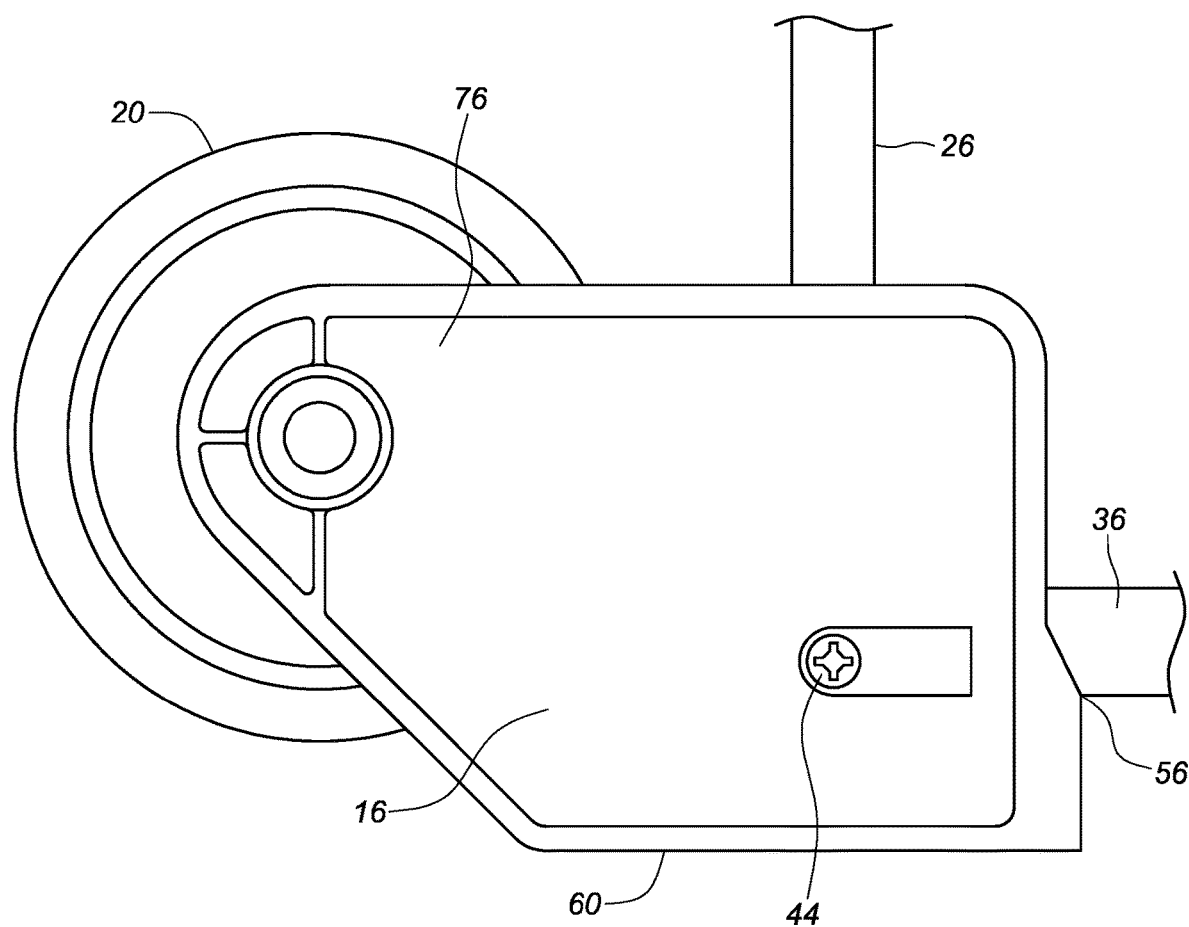
FIG. 5 is a side view of the wheel assembly in FIG. 4, according to an embodiment.

Additionally, the left wheel housing 16 may also include a base section 60, as shown in FIG. 5. A left wheel 20 may be rotatably coupled to the left wheel housing 16 and elevated above the base section 60.

Similarly, the right wheel housing 18 may also be rotatably coupled to a right wheel 22, and mirroring the configuration of the left side of the cart 10. In some embodiments the right wheel housing 18 may be rotatably coupled to the lower vertical right leg member 28 of the frame 12 and the elevated right horizontal section 38 of the platform 14.

In one embodiment, the cart 10 includes an elongated U-shaped member 64 with an upper section 66 extending to upper vertical left and right leg members 68, 70, which are rotatably coupled to the lower vertical leg members 26, 28 of the frame 12. The U-shaped member may also include a crossbar 72 and a locking member 74 for removably attaching to the horizontal section 24 of the frame 12.

Figure 6:
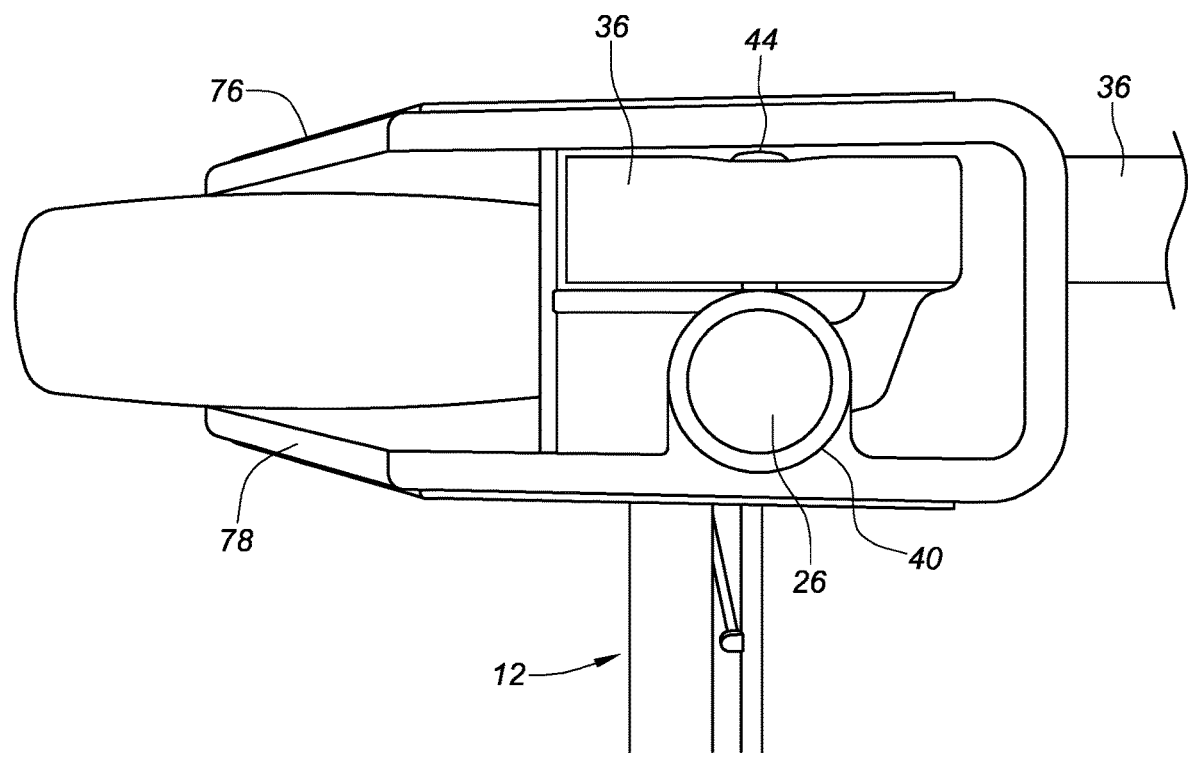
FIG. 6 is a bottom view of the wheel assembly in FIG. 4, according to an embodiment.
Figure 7:
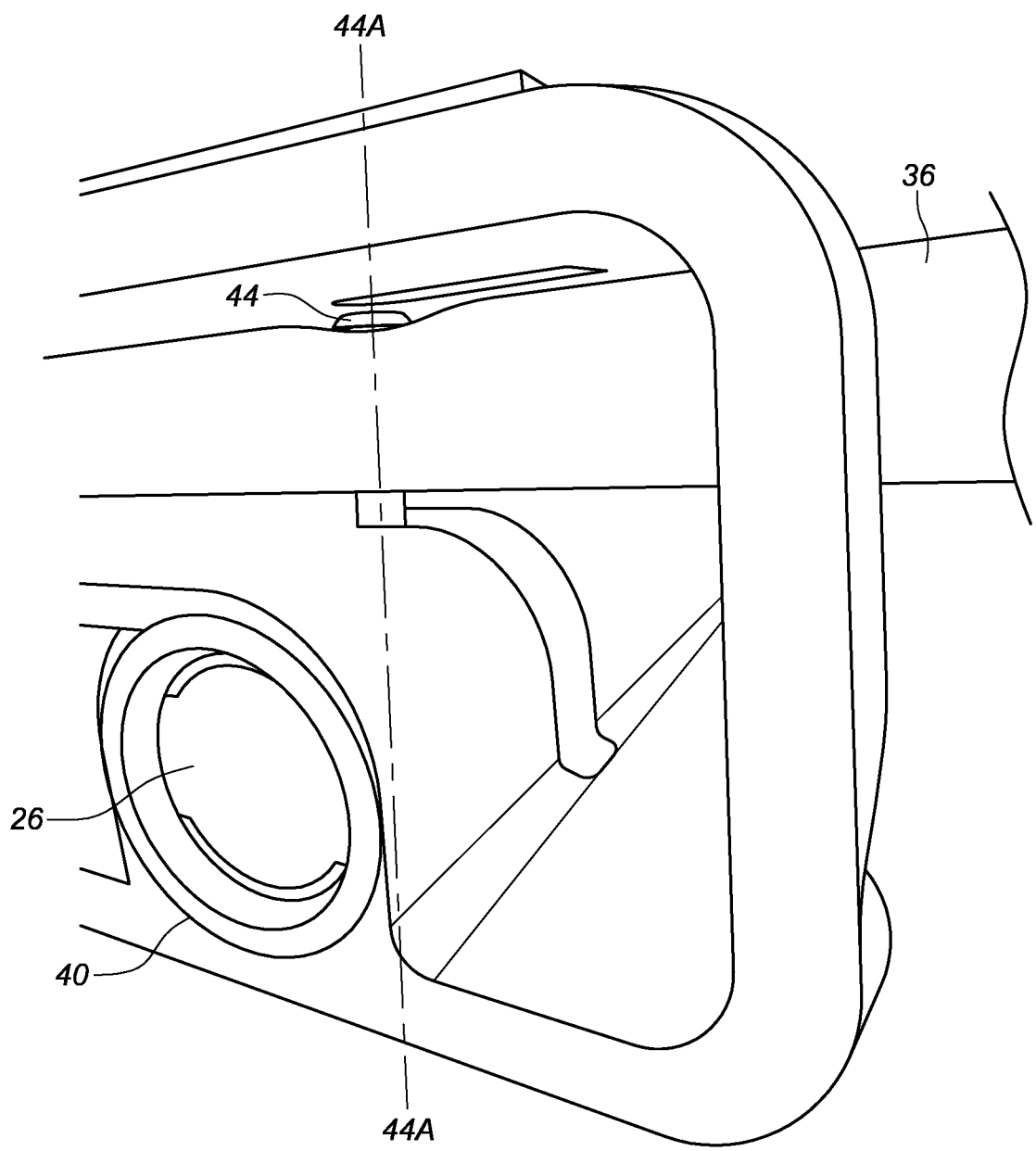
FIG. 7 is a bottom perspective view of the wheel assembly in FIG. 4, according to an embodiment.

In some embodiments, the left and right wheel housing 16, 18 may include elongated left and right sidewalls 76, 78, with the wheel 20, 22 positioned between and rotatably coupled to them, as shown in FIGS. 5 and 6. Moreover, the left and right wheel housing 16, 18 may include a top section 80, and the elongated channel 48 in the front section 46 has an arcuate section 82 extending to the top section 80. This arrangement, shown in FIG. 4, facilitates the smooth transition and rotation of the left and right wheel housing 16, 18 during the opening and closing of the platform 14.

Figure 8:
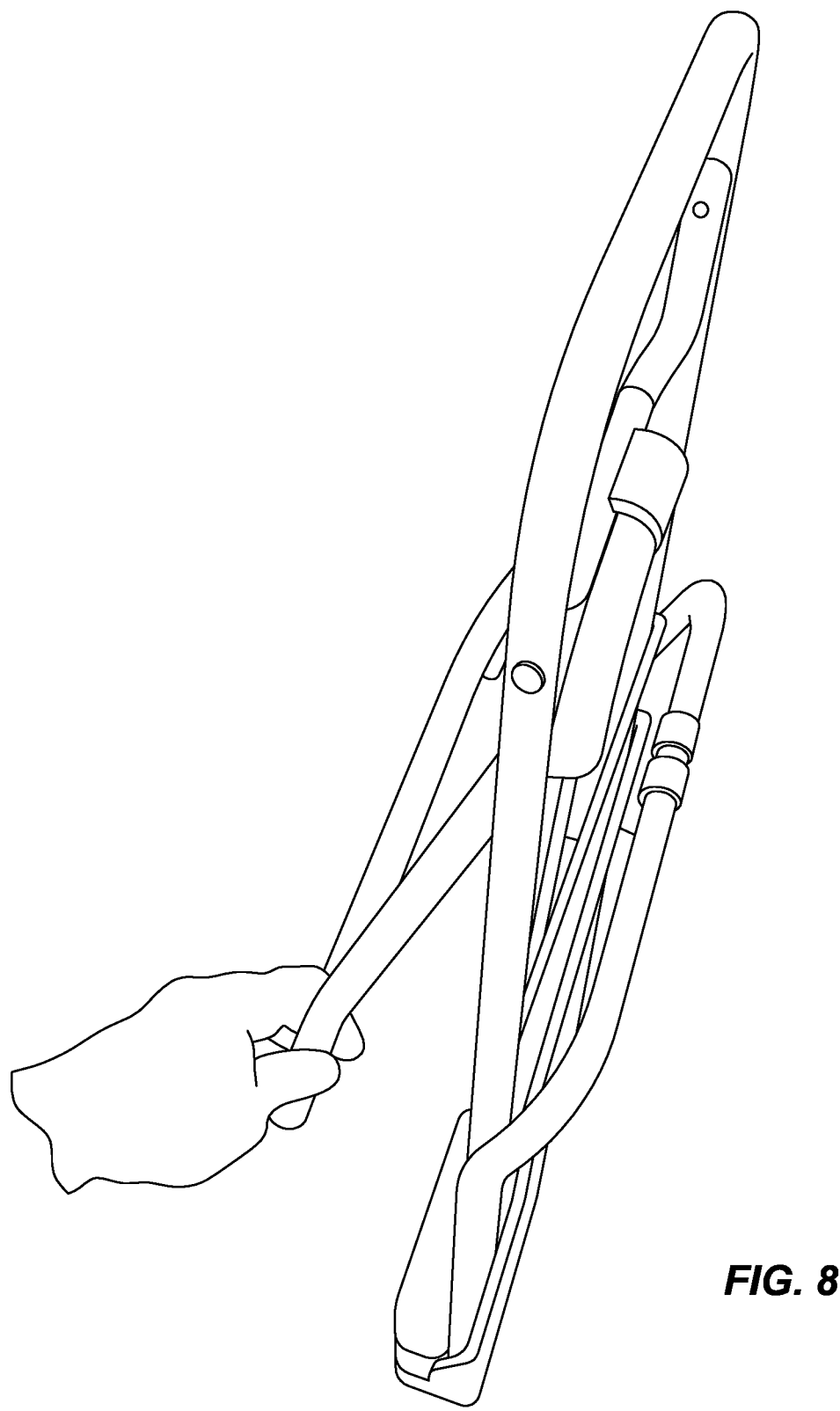
FIG. 8 is a perspective view of the collapsible cart from FIG. 1 in a closed condition, illustrating a user rotating an elongated U-shaped member of the collapsible cart to initiate transition of the collapsible cart to an open condition, according to an embodiment.
Figure 9:
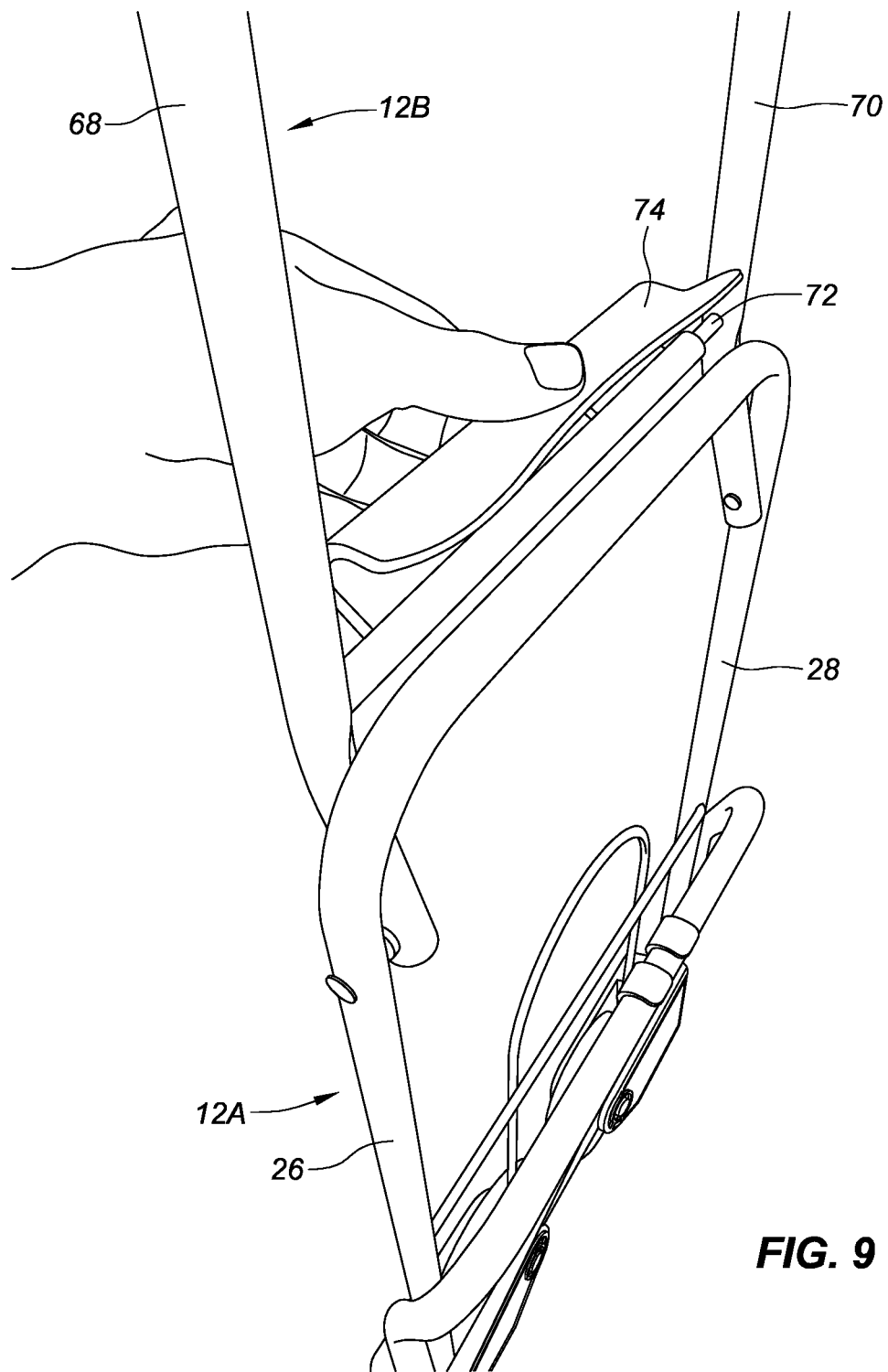
FIG. 9 is a perspective view of the collapsible cart from FIG. 1, illustrating a user coupling the elongated U-shaped member to the frame of the collapsible cart to continue transition of the collapsible cart to an open condition, according to an embodiment.
Figure 10:
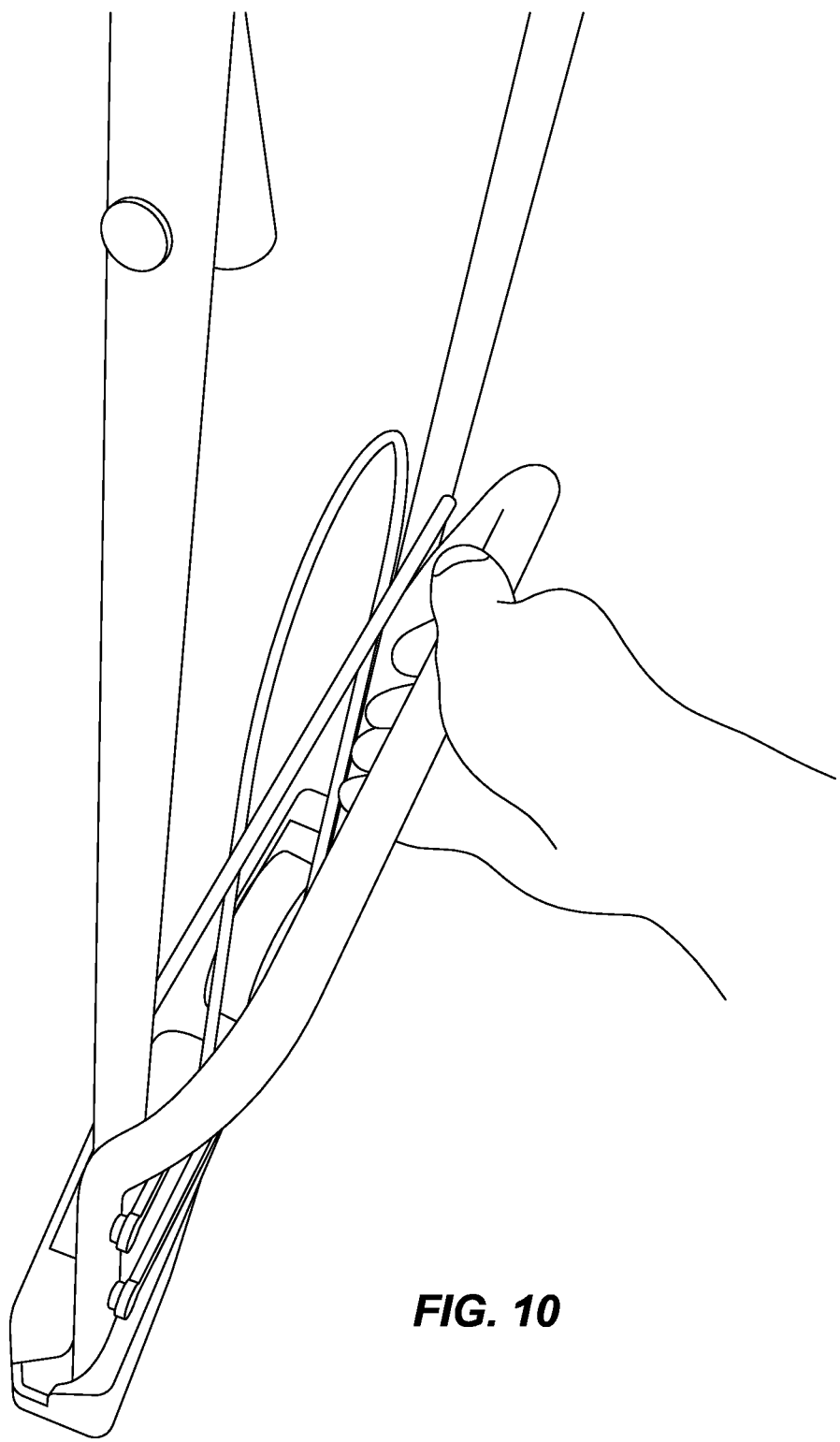
FIG. 10 is a perspective view of the collapsible cart from FIG. 1, illustrating a user rotating the load bearing member of the collapsible cart to transition of the collapsible cart to an open condition, according to an embodiment.
Figure 11:
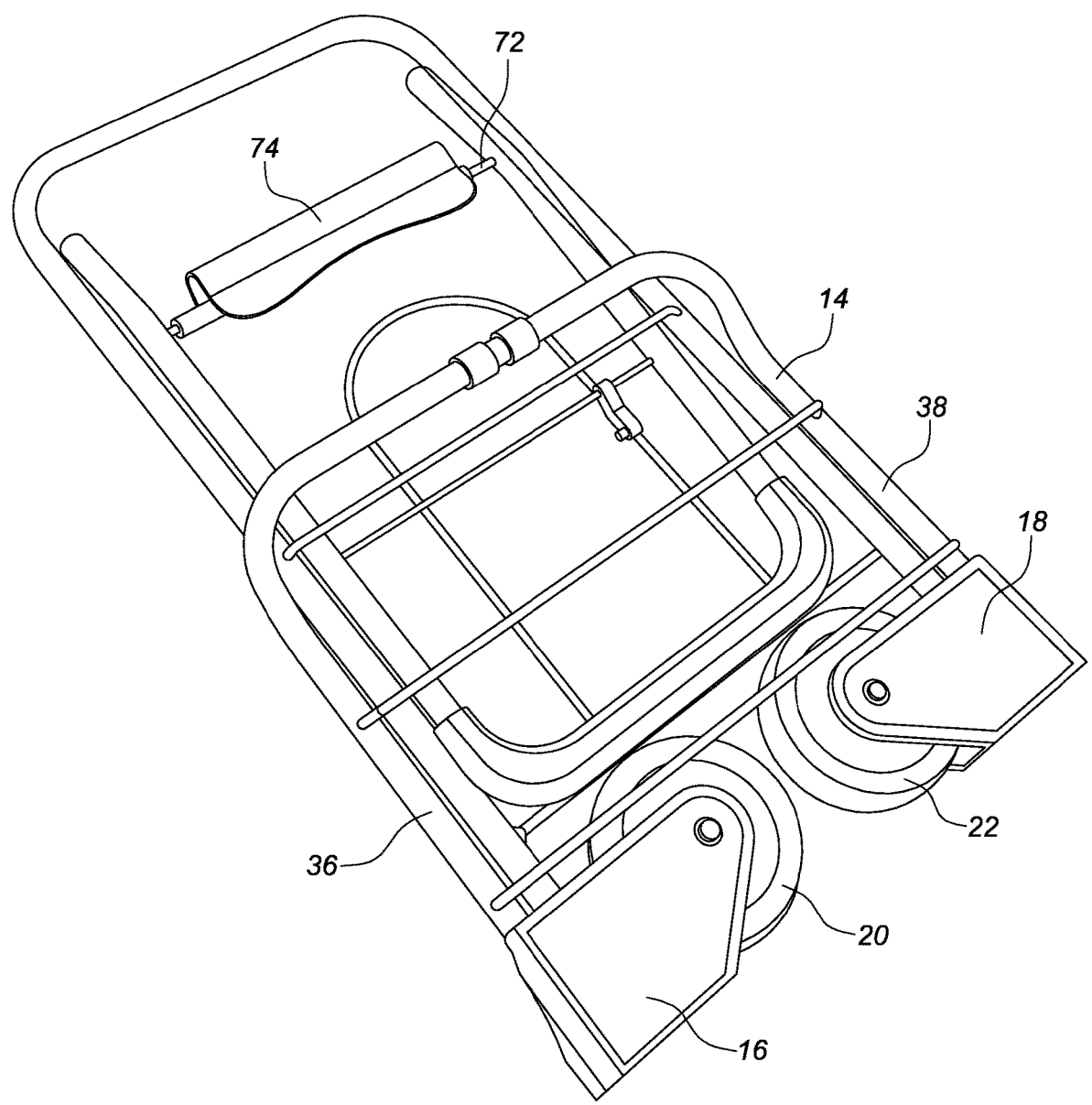
FIG. 11 is a perspective view of the collapsible cart without a flexible bag in a closed condition, according to an embodiment.
Figure 12:
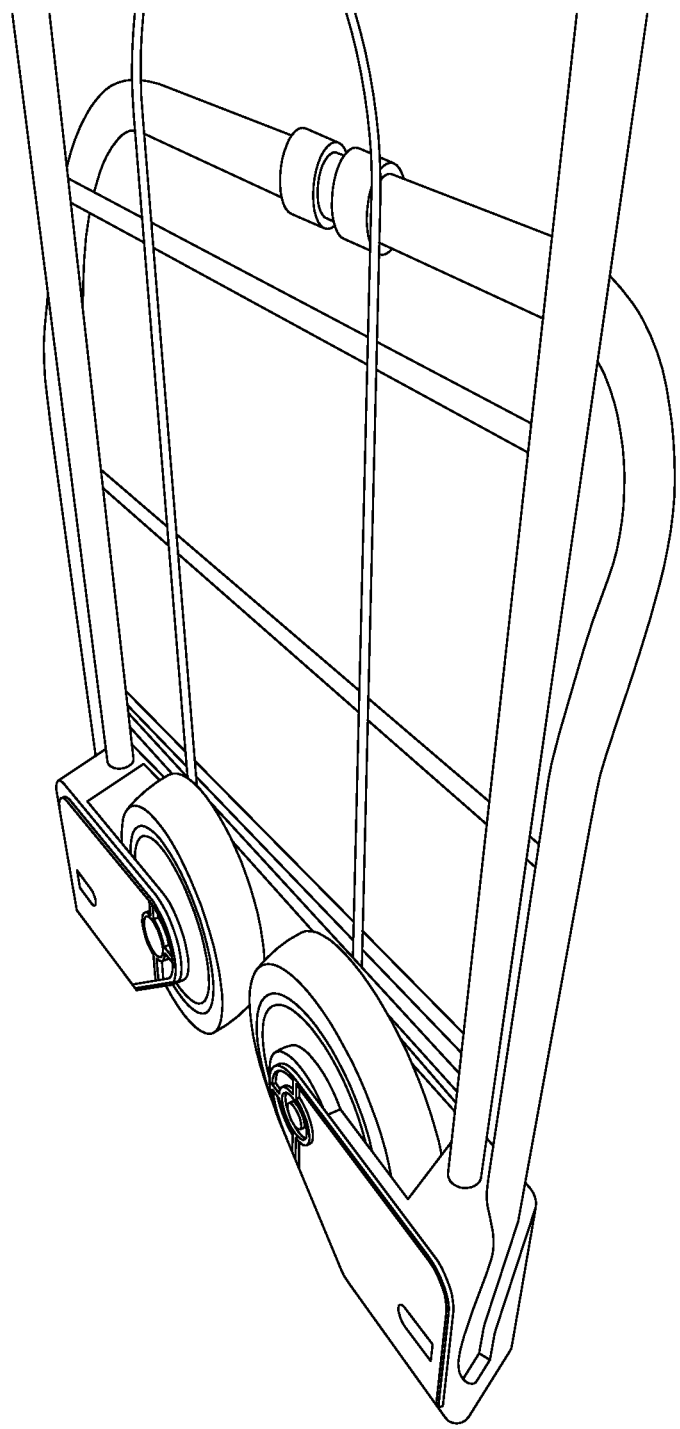
FIG. 12 is another perspective view of the collapsible cart without a flexible bag in a closed condition, illustrating folded wheel assemblies and load bearing member, according to an embodiment.

As can be appreciated, the disclosed cart offers a versatile and efficient design for transitioning between folded and expanded conditions, making it suitable for various applications requiring mobility and compact storage. FIGS. 8-10 illustrate the transitioning between folded or closed condition to an expanded or open condition, according to an embodiment. The user may rotate the load bearing member first or the elongated U-shaped member first to initiate the transition. In one embodiment, after rotating the elongated U-shaped member, the user may couple the elongated U-shaped member to the frame.

In yet another embodiment, a collapsible cart configured to transition from a closed condition where it is folded up to an open condition where it is expanded for use is provided. The collapsible cart 10 comprises a frame 12 with a left leg member 26 and a right leg member 28. The left leg member 26 may be aligned along a first frame axis and the right leg member 28 may be aligned along a second frame axis.

The cart 10 may also include a load supporting member (such as platform 14) having a bottom horizontal section 30 with a left side and a right side. The bottom horizontal section 30 extends to left and right arcuate sections 32, 34, which extends to elevated left and right horizontal sections 36, 38, respectively.

In one embodiment, the collapsible cart 10 comprises a left and right wheel assembly 100, 102, with each wheel assembly 100, 102 configured to transition simultaneously with the load supporting member 14 from an expanded open condition to a folded closed condition. In some embodiments, the left wheel assembly 100 rotates clockwise around the first frame axis, and the right wheel assembly 102 rotates counterclockwise around the second frame axis during this transition. Each wheel assembly 100, 102 comprises a wheel 20, 22 rotatably coupled to a housing 16, 18. In some embodiments, the wheel 20, 22 may be stair-climbing wheels with a plurality of tires or wheels rotatably coupled to a wheel spoke.

The housing 16, 18 of each wheel assembly 100, 102 may include a horizontal pin channel 42 and an elongated diagonal channel 48. The horizontal pin channel 42 may be used to guide a pin 44 defining a pin axis 44A to transpose horizontally along it, while the elongated diagonal channel 48 guides the elevated horizontal section 36, 38 of the load supporting member 14 to pivot around the pin axis 44A and move from a horizontal plane in the open condition to a generally vertical plane in the closed condition. This movement actuates the left or right wheel housing 16, 18 to simultaneously rotate around the first or second frame axis, respectively.

As can be appreciated, the frame 12 may be a collapsible frame comprising a first frame member 12A and a second frame member 12B, configured to transition from a closed condition to an open condition by relative pivoting of the first frame member 12A to the second frame member 12B. The first frame member 12A may include a horizontal section 24, and the second frame member includes a crossbar 72 and a locking member 74 rotatably coupled to the crossbar 72, with a fastener 74B to removably attach to the horizontal section 24 of the first frame member 12A.

As can be appreciated, the housing 16, 18 may include a vertical receptacle 40, a front section 46, a top section 80, and a base section 60. The vertical receptacle 40 of each wheel assembly 100, 102 may be adapted to receive the corresponding leg member 26, 28 of the frame 12. In one embodiment, the elongated diagonal channel 48 traverses across a portion of the front section 46 and a portion of the top section 80.

In some embodiments, the collapsible cart 10 further includes a flexible bag 62 removably coupled to the frame 12, with four vertical walls 62A, an openable top 62B, and a bottom wall 62C. In an open condition, the flexible bag 62 rests on the load supporting member 14, adding to the cart's versatility for various carrying needs.

In yet another embodiment, a collapsible cart 10 comprises a frame 12 with a leg member 26 or 28 defining a generally vertical axis. The cart 10 also includes a load bearing member (such as platform 14) comprising a horizontal section 36 or 38, with the horizontal section 26 or 38 rotatably coupled to the leg member 26 or 28 via a pin 44 defining a pin axis 44A.

As can be appreciated, the collapsible cart 10 may include a wheel assembly 100 or 102 configured to transition simultaneously with the load bearing member 14 from an expanded open condition to a folded closed condition. Each wheel assembly 100 or 102 comprises a wheel 20 or 22 rotatably coupled to a housing 16 or 18.

In some embodiments, the housing 16 or 18 of each wheel assembly 100 or 102 includes a horizontal pin channel 42 and an elongated diagonal channel 48. The horizontal pin channel 42 may guide the pin 44 to transpose horizontally along it while rotatably coupling the leg member 26 or 28 of the frame 12 to the horizontal section 36 or 38 of the load bearing member 14. The elongated diagonal channel 48 may guide the horizontal section 36 or 38 of the load bearing member 14 to pivot around the pin axis 44A and move from a horizontal plane in the open condition to a generally vertical plane in the closed condition. A person skilled in the art would appreciate that this movement may actuate the housing 16 or 18 to rotate around the generally vertical axis.

In other embodiments, the wheel assembly 100 or 102 may have a width at least equal to half of the width of the load bearing member 14, ensuring stability and support during transitions. The wheel assembly 100 or 102 may rotate about forty-five degrees around the generally vertical axis to transition from an expanded open condition to a folded closed condition, providing efficient folding and unfolding mechanisms.

As can be appreciated, the wheel housing 16, 18 is intricately designed to transition seamlessly with the load bearing member 14, facilitating the cart's transformation from a folded closed condition to an expanded open condition and vice versa. The housing 16, 18 comprises a horizontal pin channel 42 and an elongated diagonal channel 48, allowing for precise guidance and rotation of the load bearing member 14, which contributes to the overall stability and maneuverability of the cart 10.

One notable benefit of this design is the efficient use of space and resources. The wheel assembly's ability to rotate around the generally vertical axis enables the cart 10 to fold and unfold smoothly, making it compact and easily storable when not in use. This feature is particularly advantageous in environments where space is limited, such as warehouses, retail stores, or transportation vehicles, as it maximizes storage capacity and minimizes obstruction during transit or storage.

Moreover, the design of the wheel housing or assembly enhances the cart's durability and reliability. The housing's robust construction, coupled with the precise mechanisms for rotation and coupling, ensures long-lasting performance and minimal maintenance requirements. This durability translates to cost-effectiveness for users, as the cart 10 can withstand regular use and handling without compromising its structural integrity or operational efficiency. Overall, the wheel housing and/or wheel assembly design embodied in the present disclosure improves the collapsible cart's functionality, usability, and practicality across various applications and environments.

The collapsible carts may be engineered for urban environments, featuring high-performance wheels designed to navigate various floor surfaces with ease. Furthermore, select wheel assemblies may include retractable mechanisms for compact storage in crowded spaces, further enhancing the assembly's portability and convenience.

Moreover, at least one of the wheel assemblies may include a brake assembly with a brake lever arm, providing additional control over the cart's movement when necessary. This embodiment ensures both mobility and stability, catering to diverse transportation needs.

Although the various inventive aspects are herein disclosed in the context of certain preferred embodiments, implementations, and examples, it will be understood by those skilled in the art that the present invention extends beyond the specifically disclosed embodiments to other alternative embodiments and/or uses of the invention and obvious modifications and equivalents thereof. In addition, while a number of variations of the inventive aspects have been shown and described in detail, other modifications, which are within their scope will be readily apparent to those of skill in the art based upon this disclosure. It should be also understood that the scope this disclosure includes the various combinations or sub-combinations of the specific features and aspects of the embodiments disclosed herein, such that the various features, modes of implementation, and aspects of the disclosed subject matter may be combined with or substituted for one another. Thus, it is intended that the scope of the present invention herein disclosed should not be limited by the particular disclosed embodiments or implementations described above, but should be determined only by a fair reading of the claims.

Similarly, this disclosure is not be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

Further, all claim terms should be interpreted in their most expansive forms so as to afford the applicant the broadest coverage legally permissible. Although the embodiments have been described with reference to the drawings and specific examples, it will readily be appreciated by those skilled in the art that many modifications and adaptations of the processes, methods and apparatuses described herein are possible without departure from the spirit and scope of the embodiments as claimed herein. Thus, it is to be clearly understood that this description is made only by way of example and not as a limitation on the scope of the embodiments as claimed below.

What is claimed is:

1. A cart comprising:
   a frame having a horizontal section with a left side and a right side, the horizontal section extending from its left side to a lower vertical left leg member and from its right side to a lower vertical right leg member, the lower vertical left leg member and the lower vertical right leg member each extending generally vertical along a first vertical plane;
   a platform configured to transition from a folded closed condition to an expanded open condition, the platform having a bottom horizontal section with a left side and a right side, the bottom horizontal section extending on the left side to a left arcuate section that, in the open condition, extends to an elevated left horizontal section, and extending on the right side to a right arcuate section that, in the open condition, extends to an elevated right horizontal section;
   a left wheel housing configured to transition simultaneously with the platform from a folded closed condition to an expanded open condition, the left wheel housing rotatably coupled to the lower vertical left leg member of the frame and the elevated left horizontal section of the platform, the left wheel housing comprising a vertical receptacle, a front section, and a base section,
   the vertical receptacle is adapted to receive the lower vertical left leg member of the frame, and comprises a horizontal pin channel guiding a first pin to transpose horizontally along the horizontal pin channel while rotatably coupling the lower vertical left leg member of the frame to the elevated left horizontal section of the platform,
   the front section comprising an elongated channel having a diagonal channel between a first vertical channel and a second vertical channel, the elongated channel is configured to guide the elevated left horizontal section of the platform to move from a horizontal plane in the open condition that it wherein the platform is resting on a lower edge of the first vertical channel to a second vertical plane in the closed condition wherein the platform is adjacent an upper edge of the second vertical channel, wherein the movement of the elevated left horizontal section along the diagonal channel rotates the left wheel housing, and
   a left wheel rotatably coupled to the left wheel housing and elevated above the base section of the left wheel housing.

2. The cart of claim 1, further comprising:
   a right wheel housing configured to transition simultaneously with the platform from a folded closed condition to an expanded open condition, the right wheel housing rotatably coupled to the lower vertical right leg member of the frame and the elevated right horizontal section of the platform, the right wheel housing comprising a vertical receptacle, a front section, and a base section;
   the vertical receptacle is adapted to receive the lower vertical right leg member of the frame, and comprises a horizontal pin channel guiding a second pin to transpose horizontally along the horizontal pin channel while rotatably coupling the lower vertical right leg member of the frame to the elevated right horizontal section of the platform,
   the front section comprising an elongated channel having a diagonal channel between a first vertical channel and a second vertical channel, the elongated channel is configured to guide the elevated right horizontal section of the platform to move from a horizontal plane in the open condition wherein the platform is resting on a lower edge of the first vertical channel to a second vertical plane in the closed condition wherein the platform is adjacent an upper edge of the second vertical channel, wherein the movement of the elevated right horizontal section along the diagonal channel rotates the right wheel housing, and
   a right wheel rotatably coupled to the right wheel housing and elevated above the base section of the right wheel housing.

3. The cart of claim 1, further comprising an elongated U-shaped member having an upper section, the upper section extends to an upper vertical left leg member and an upper vertical right leg member, the upper vertical left leg member is rotatably coupled to the lower vertical left leg member, and the upper vertical right leg member is rotatably coupled to the lower vertical right leg member.

4. The cart of claim 3, wherein the elongated U-shaped member further comprising a crossbar and a locking member, the crossbar extending across from the upper vertical left leg member and the upper vertical right leg member, the locking member is rotatably coupled to the crossbar and includes a fastener to removably attach to the horizontal section of the frame.

5. The cart of claim 1, wherein the left wheel housing comprises an elongated left sidewall and an elongated right sidewall, the left wheel is positioned between and rotatably coupled to the elongated left sidewall and the elongated right sidewall.

6. The cart of claim 1,
wherein the left wheel housing further comprising a top section, and
wherein the second vertical channel of the elongated channel comprises an arcuate section extending from the front section to the top section.

7. The cart of claim 1, wherein the elongated channel separating two surfaces of the front section, each surface aligned along a separate vertical plane.

8. A collapsible cart configured to transition from a folded closed condition to an expanded open condition, the collapsible cart comprising:
a frame comprising a left leg member and a right leg member, the left leg member aligned along a first frame axis and the right leg member aligned along a second frame axis;
a load supporting member having a bottom horizontal section with a left side and a right side, the bottom horizontal section extending on the left side to a left arcuate section that, in the open condition, extends to an elevated left horizontal section, and extending on the right side to a right arcuate section that, in the open condition, extends to an elevated right horizontal section;
a left and a right wheel assembly, each wheel assembly configured to transition simultaneously with the load supporting member from an expanded open condition to a folded closed condition, the left wheel assembly rotates clockwise around the first frame axis and the right wheel assembly rotates counterclockwise around the second frame axis to transition from an expanded open condition to a folded closed condition, each wheel assembly comprising a wheel rotatably coupled to a housing,
the housing comprises a horizontal pin channel and an elongated diagonal channel,
the horizontal pin channel is adapted to guide a pin defining a pin axis to transpose horizontally along the horizontal pin channel while rotatably coupling the left or right leg member of the frame to the elevated left or right horizontal section of the load supporting member, respectively,
the elongated diagonal channel is adapted to guide the elevated left or right horizontal section of the load supporting member to pivot around the pin axis and move from a horizontal plane in the open condition to a generally vertical plane in the closed condition, and
wherein the movement of the elevated left or right horizontal section along the elongated diagonal channel actuates the left or right wheel housing to rotate around the first or second frame axis, respectively.

9. The collapsible cart of claim 8, wherein the housing comprises a base section, and wherein the wheel is elevated above the base section.

10. The collapsible cart of claim 8, wherein the frame is a collapsible frame comprising a first frame member and a second frame member, the collapsible frame configured to transition from a closed condition where it is folded up to an open condition where it is expanded for use by a relative pivoting of the first frame member to the second frame member.

11. The collapsible cart of claim 10, wherein the first frame member comprises a horizontal section and the second frame member comprises a crossbar and a locking member, the locking member is rotatably coupled to the crossbar and includes a fastener to removably attach to the horizontal section of the first frame member.

12. The collapsible cart of claim 8, wherein the housing comprises a vertical receptacle, a front section, a top section, and a base section.

13. The collapsible cart of claim 12, wherein the vertical receptacle of the left wheel assembly is adapted to receive the left leg member of the frame, and the vertical receptacle of the right wheel assembly is adapted to receive the right leg member of the frame.

14. The collapsible cart of claim 12, wherein the elongated diagonal channel traverses across a portion of the front section and a portion of the top section.

15. The collapsible cart of claim 8, wherein the housing comprises an elongated left sidewall and an elongated right sidewall, and wherein the wheel is positioned between and rotatably coupled to the elongated left sidewall and the elongated right sidewall.

16. The collapsible cart of claim 8, further comprising:
a flexible bag having four vertical walls, an openable top, and a bottom wall, the flexible bag removably coupled to the frame, and in an open condition, the flexible bag rests on the load supporting member.

17. A collapsible cart, configured to transition from a folded closed condition to an expanded open condition, the collapsible cart comprising:
a frame comprising a leg member defining a generally vertical axis;
a load bearing member comprising a horizontal section, the horizontal section rotatably coupled to the leg member via a pin defining a pin axis;
a wheel assembly configured to transition simultaneously with the load bearing member from an expanded open condition to a folded closed condition, each wheel assembly comprising a wheel rotatably coupled to a housing,
the housing comprises a horizontal pin channel and an elongated diagonal channel,
the horizontal pin channel is adapted to guide the pin to transpose horizontally along the horizontal pin channel while rotatably coupling the leg member of the frame to the horizontal section of the load bearing member,
the elongated diagonal channel is adapted to guide the horizontal section of the load bearing member to pivot around the pin axis and move from a horizontal plane in the open condition to a generally vertical plane in the closed condition, and
wherein the movement of the horizontal section along the elongated diagonal channel actuates the housing to rotate around the generally vertical axis.

18. The collapsible cart of claim 17, wherein the wheel assembly has a width at least equal to half of a width of the load bearing member.

19. The collapsible cart of claim 17, wherein the wheel assembly rotates about forty-five degrees around the generally vertical axis to transition from an expanded open condition to a folded closed condition.

20. The collapsible cart of claim 17, wherein the housing comprises a front section and a top section, the elongated diagonal channel traversing across a portion of the front section and a portion of the top section.

\* \* \* \* \*